US008772728B2

(12) United States Patent
Tredwell (10) Patent No.: US 8,772,728 B2
(45) Date of Patent: Jul. 8, 2014

(54) APPARATUS AND METHODS FOR HIGH PERFORMANCE RADIOGRAPHIC IMAGING ARRAY INCLUDING REFLECTIVE CAPABILITY

(75) Inventor: Timothy J. Tredwell, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 237 days.

(21) Appl. No.: 12/982,940

(22) Filed: Dec. 31, 2010

(65) Prior Publication Data

US 2012/0168633 A1    Jul. 5, 2012

(51) Int. Cl.
*G01T 1/24*    (2006.01)

(52) U.S. Cl.
USPC .................................... 250/370.01

(58) Field of Classification Search
USPC ............. 250/370.01–370.09, 370.11–370.15, 250/370.1, 368
See application file for complete search history.

(56) References Cited

U.S. PATENT DOCUMENTS

| 4,914,301 | A  | * | 4/1990  | Akai ........................ 250/370.01 |
| 5,596,198 | A  | * | 1/1997  | Perez-Mendez ......... 250/370.11 |
| 6,031,234 | A  |   | 2/2000  | Albagli et al. |
| 6,455,857 | B1 | * | 9/2002  | Iwabuchi .................. 250/370.01 |
| 6,655,675 | B2 | * | 12/2003 | Rutten et al. .................. 250/368 |
| 6,949,748 | B2 | * | 9/2005  | Ziock et al. ............. 250/370.01 |
| 6,989,539 | B2 | * | 1/2006  | Wischmann et al. .... 250/370.11 |
| 7,244,945 | B2 | * | 7/2007  | Okada et al. ............. 250/370.11 |
| 7,351,978 | B2 | * | 4/2008  | Spahn ....................... 250/370.11 |
| 7,479,640 | B2 | * | 1/2009  | Misawa .................... 250/370.09 |
| 7,569,832 | B2 | * | 8/2009  | Tredwell et al. ......... 250/370.11 |
| 7,750,306 | B2 | * | 7/2010  | Menge et al. ................. 250/368 |
| 2002/0080265 | A1 | * | 6/2002 | Hoffman ....................... 348/374 |
| 2005/0285044 | A1 |   | 12/2005 | Mollov |
| 2008/0087832 | A1 | * | 4/2008 | Sato et al. ................ 250/370.01 |
| 2009/0146070 | A1 |   | 6/2009 | Vieira Da Rocha et al. |
| 2009/0181491 | A1 |   | 7/2009 | Roizin et al. |
| 2009/0283689 | A1 | * | 11/2009 | Mochizuki et al. ...... 250/370.14 |

FOREIGN PATENT DOCUMENTS

| EP | 2 110 685 A2 | 10/2009 |
| WO | 2006/018804 A1 | 2/2006 |
| WO | 2008/059407 A1 | 5/2008 |
| WO | 2008/129473 A2 | 10/2008 |

OTHER PUBLICATIONS

International Search Report completed on Jul. 13, 2012 for International Search Report PCT/US2011/065047, 3 pages.

* cited by examiner

*Primary Examiner* — David Porta
*Assistant Examiner* — Taeho Jo (57) ABSTRACT

Embodiments of methods/apparatus according to the application can include radiographic imaging device comprising an imaging array of pixels or a plurality of photosensors including a first side to receive light from a scintillator and a second side to pass second light responsive to impingement of the scintillator light and a reflective layer configured to reflect third light responsive to impingement of the second light. Exemplary photosensors can absorb a prescribed amount of the scintillator light received through a first transparent side and the third light received through a second transparent side. Exemplary reflective arrangements can be selected based upon scintillotor emission characteristics and/or photosensor absorption characteristics. Embodiments of radiographic detector arrays and methods can reduce photosensor thickness to reduce noise, reduce image lag and/or increase charge capacity. Embodiments can maintain the quantum efficiency of a reduced thickness photosensor.

20 Claims, 13 Drawing Sheets

APPARATUS AND METHODS FOR HIGH PERFORMANCE RADIOGRAPHIC IMAGING ARRAY INCLUDING REFLECTIVE CAPABILITY

FIELD OF THE INVENTION

This invention relates generally to the field of diagnostic imaging and more particularly relates to methods and/or systems for digital radiographic detectors.

BACKGROUND OF THE INVENTION

Traditionally, flat panel image sensors for digital radiographic (DR) applications employ a scintillator to convert incoming X-ray radiation to visible light and a flat-panel image sensor to convert the visible light into an electrical signal. The pixel of a flat-panel image sensor comprises a photo-sensor and a readout element. Examples of photosensors include PIN photodiodes, MIS photo-sensors, phototransistors and photo-conductors. Such conventional DR image sensors generally use amorphous-Silicon (a-Si) for the photo-sensors and readout elements. Further, such related art DR image sensors can be used for radiographic applications, fluoroscopic applications and/or volume image reconstruction applications.

SUMMARY OF THE INVENTION

Accordingly, it is an aspect of this application to address in whole or in part, at least the foregoing and other deficiencies in the related art.

It is another aspect of this application to provide in whole or in part, at least the advantages described herein.

In one aspect of the disclosure, photosensor components of a flat panel DR detector (FPD) can provide improved quantum efficiency (QE) (e.g., in a prescribed wavelength band, for a 550-700 nm wavelength band or overall photosensor QE) when a light-transmissive back-contact and a reflective optical mechanism is used beneath the photosensor. The photosensors can be top-illuminated photosensors.

In another aspect, embodiments of a photosensor can provide a reflective optical mechanism that can include a reflective layer, one or more dielectrics with thickness(es), a dielectric film, a reflective organic layer and optical property/properties to increase or optimize overall quantum efficiency in conjunction with scintillator emission characteristics and photosensor characteristics. The reflective layer can operate to improve photosensor performance characteristics such as by reducing cross-talk between pixels or the like.

In another aspect, embodiments of the application can reduce a thickness of semiconductor material portions of photosensors to reduce lag, increase charge capacity and/or decrease dark current.

In another aspect, embodiments of the application can provide an optical reset unit to reset photosensors by passing reset light through a reflective layer or optical reflector mechanism.

In one embodiment, a radiographic imaging system can include a scintillator, a plurality of photosensitive elements including a first side to receive first light from the scintillator and including a second side to pass second light responsive to impingement of the first light, a reflective layer receiving the second light from the plurality of photosensitive elements and configured to reflect third light responsive to impingement of the second light, and a substrate on the second side of the plurality of photosensitive elements, wherein photosensitive element characteristics of the plurality of photosensitive elements are selected to absorb a prescribed amount of the first light received through the first side and the third light received through the second side, wherein the reflectivity of the reflective layer is greater than 50%.

In yet another embodiment, a method for operating a radiographic imaging apparatus for capturing a plurality of x-ray images of an object, the method can include providing a scintillation screen for receiving incident radiation and responding by emitting excited radiation at a first band of wavelengths, providing an array of photosensors including a first light-transmissive side and a second light-transmissive side, the first light-transmissive side for receiving first light at the first band of wavelengths from the scintillator, the second side for passing second light responsive to impingement of the first light, providing a reflective layer for receiving the second light from the array of photosensors and for reflecting third light responsive to impingement of the second light, and providing a substrate over the second side for supporting the array of photosensitive elements, the array of photosensors absorbing a prescribed amount of the first light received through the first side and absorbing a prescribed amount of the third light received through the second side, wherein the reflectivity of the reflective layer is greater than 50%.

BRIEF DESCRIPTION OF THE DRAWINGS

For a further understanding of the invention, reference will be made to the following detailed description of the invention which is to be read in connection with the accompanying drawing, wherein.

DESCRIPTION OF EXEMPLARY EMBODIMENTS

The following is a description of exemplary embodiments according to the application, reference being made to the drawings in which the same reference numerals identify the same elements of structure in each of the several figures, and similar descriptions concerning components and arrangement or interaction of components already described are omitted. Where they are used, the terms "first", "second", and so on, do not necessarily denote any ordinal or priority relation, but may simply be used to more clearly distinguish one element from another.

One objective of embodiments of apparatus and/methods thereof according to the application is to increase the photosensitivity of flat-panel image sensors used for digital radiography. Flat panel image sensors for DR applications use a scintillator to convert incoming X-ray radiation to visible light and a flat-panel image sensor to convert the visible light into an electrical signal. A pixel of a flat-panel image sensor includes a photo-sensor and a readout element. Examples of photo-sensors include PIN photodiodes, MIS photo-sensors, photo-transistors and photo-conductors. The photo-sensors can be illuminated from one side. The spectral quantum efficiency (QE) of the photo-sensors depends on the optical properties and thicknesses of the insulating layers overlying the photo-sensor, the carrier generation caused by light absorption in each of the semiconducting layers, and the optical properties of the layers underlying the photo-sensor. As an example, in a PIN photodiode, approximately 80% of the photons incident on the photodiode are optically transmitted to the amorphous silicon semiconductor. A portion of these incident photons will be absorbed in the semiconductor layers and portion will be absorbed by the back-side contact. At wavelengths>550 nm and typical a-Si semiconductor thicknesses of 500 nm, a significant portion of the incident photons penetrate and pass through the a-Si layers and are absorbed in the metallic back contact; and accordingly, these photons do not generate free carriers. Backside contact metals, such as Mo and MoW, are highly absorptive.

To increase absorption of the light by the photosensor, a thickness is increased. However, as a total number of charge traps in the photosensor (e.g., a-Si) are increased, a dark current and/or an image lag, which depend on the total number of charge traps, also increase. Further, light output by the scintillator is dependent on the characteristics of the scintillator, and light absorption in the photosensor is dependent on the absorption characteristics of a material comprising the photosensor.

In one embodiment, a pixel for a DR detector can comprise a photosensor including a light-transmissive front and back (e.g., first and second) sides, read out electronics and a reflector capability corresponding to the light-transmissive back side to improved quantum efficiency in the pixel. For example, improved quantum efficiency in photosensors can be obtained in the red spectrum when a light-transmissive back-contact is used for the photodiode and a reflective layer is used beneath the photodiode.

Figure 1:
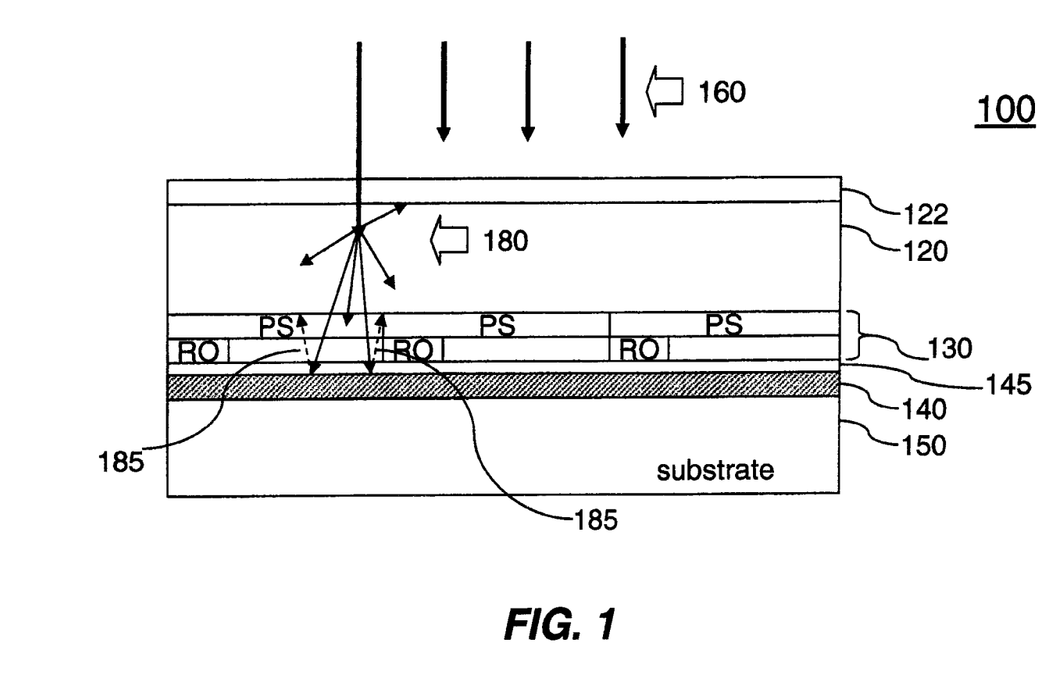
FIG. 1 is a diagram that shows the construction of an exemplary embodiment of an x-ray detector in accordance with the application.

FIG. 1 shows construction of an exemplary embodiment of an x-ray detector in accordance with the application. As shown in FIG. 1, an x-ray detector 100 can include a scintillator 120, an imaging array 130, a reflective layer 140 and a substrate 150. X-rays 160 are incident on the scintillator 120. The x-rays 160 are converted into visible light 180 therein. A protective layer 122 can be provided at the scintillator 120 to protect the scintillator 120. The imaging array 130 can include photosensors PS and read out electronic RO, which can include data lines, scan lines, amplifiers, transistors and the like. As shown in FIG. 1, the photosensors PS can form a continuous layer and the read out electronics RO can be vertically integrated below the photosensors PS. As shown in FIG. 1, the photosensors PS can include an optically transmissive back-side contact and/or electrode. At least some of the light rays 180 can impinge the individual photosensors PS. The light rays 180 not only impinge on the photosensors PS, but also a portion are absorbed and a portion pass completely through. The backside reflective layer 140 can be positioned to redirect reflected light 185 that passed through the photosensors PS back to the photosensors PS to increase the amount of light 180 absorbed by the photosensors PS.

As shown in FIG. 1, the light rays 180 can impinge a first side of the photosensors PS and the reflected light 185 can impinge a second side (e.g., an opposite side) of the photosensors PS. For example, reflected from the reflective layer 140, the reflected light 185 can reach the relevant photosensors PS so as to contribute to signal generation by the x-ray detector 100. The substrate 150 (e.g., a glass substrate) can be provided underneath the reflective layer 140. In one embodiment, an optically transmissive insulating layer (e.g., dielectric layer) 145 can be between the reflective layer 140 and the photosensor PS to reduce or prevent interference therebetween (e.g., alloy formation). The substrate 150 can act as a support or substrate for the x-ray detector 100.

Figure 2:
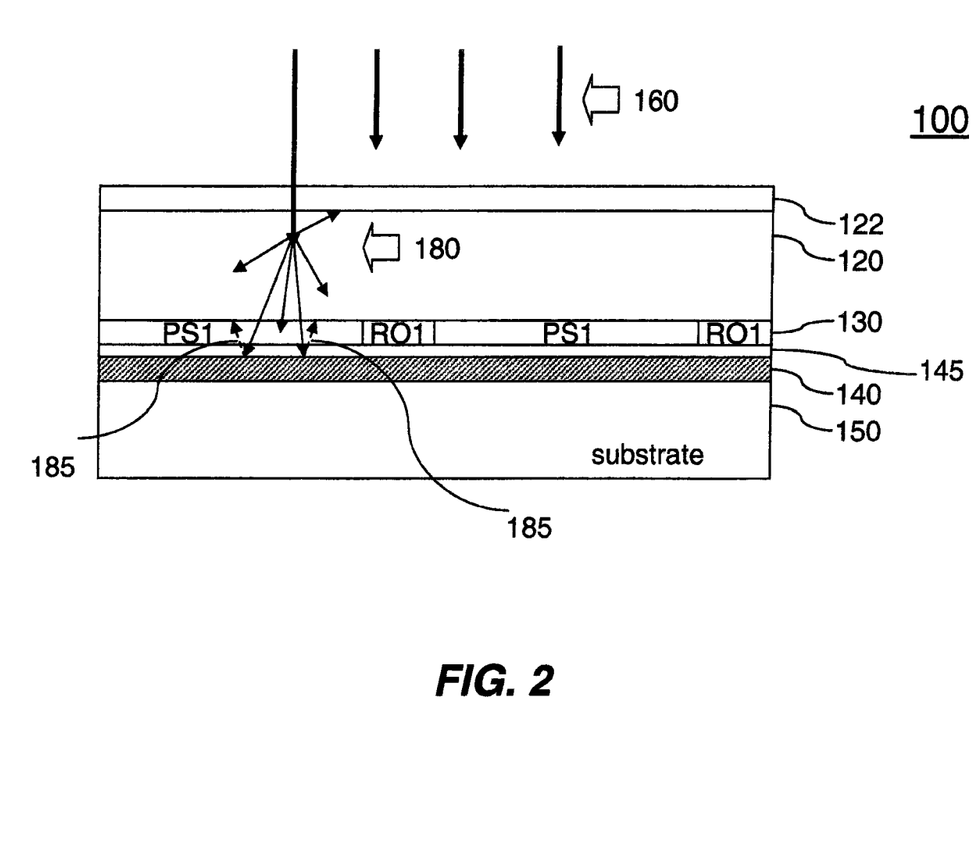
FIG. 2 is a diagram that shows the construction of another exemplary embodiment of a DR detector in accordance with the application.

FIG. 2 shows the construction of another exemplary embodiment of an x-ray detector in accordance with the application. As shown in FIG. 2, read out electronics RO1 can be disposed in the same layer or co-planar with photosensors PS1. In one embodiment, the photosensors PS1 can include an optically transmissive back-side contact and/or electrode. Examples of the photosensors PS1 can include, but are not limited to PIN photodiodes, MIS photo-sensors, photo-transistors and photo-conductors.

Figure 3:
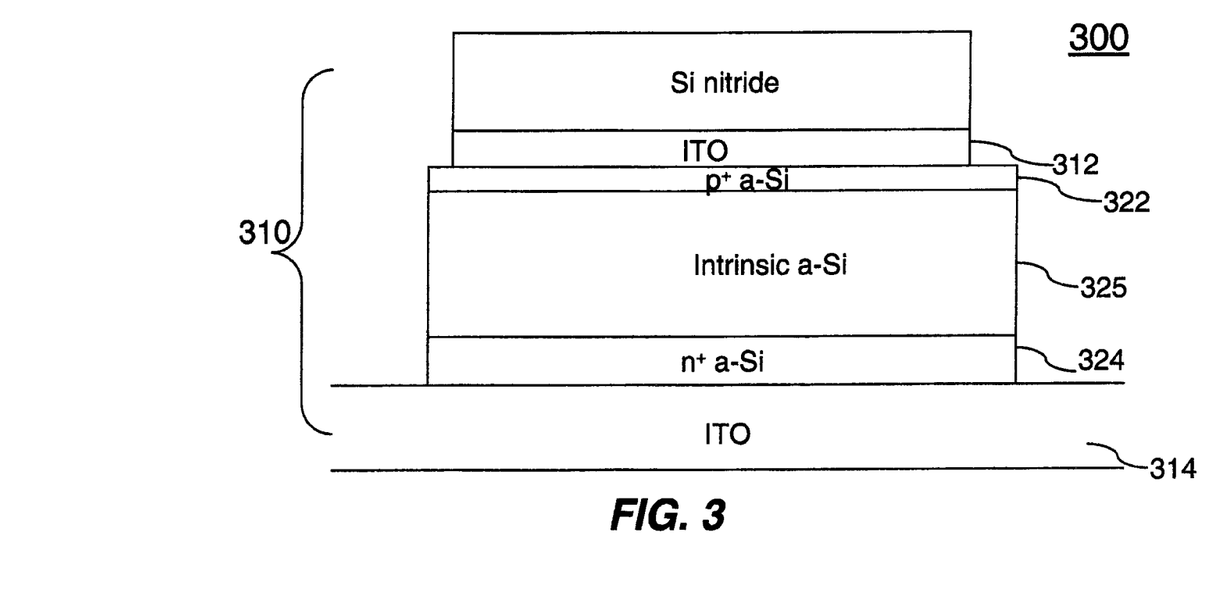
FIG. 3 schematically illustrates an exemplary embodiment of a photosensor having a transparent top electrode/contact and a transparent bottom electrode/contact according to the application.

Photosensors PS, PS1 can include transparent conductive electrodes and/or contacts. FIG. 3 is a diagram that shows cross-sectional view of an exemplary embodiment of photosensor structure 300 that can pass light impinging on a top (e.g., first) electrode and/or a bottom (e.g., second) electrode. As shown in FIG. 3, a flat panel DR image sensor of the indirect conversion type can include a scintillator screen (not shown) in front of the image sensor.

As shown in FIG. 3, an amorphous-Si based photodiode structure can be used for the photosensor PS, PS1. Top and bottom electrodes 312, 314 can be transparent or light-transmissive formed of material such as ITO or ZnO:Al electrodes. Both a p-type region 322 and an n-type region 324 of a PIN photodiode 310 can include doped hydrogenated amorphous silicon (a-Si:H). An undoped a-Si:H layer 325 can be used as an intrinsic layer. Semiconductor layers in the exemplary photodiode structure 300 of FIG. 3 can be formed using a multi-chamber plasma-enhanced chemical vapor deposition (PECVD) system at relatively low temperatures (e.g., 150° C.-300° C.). In one embodiment, exemplary dimensions for the photodiode structure 300 can include a Si nitride layer, e.g., about 170 nm, a ITO layer, e.g., about 40 nm can form the top electrode; the PIN photodiode can include the p-type region 322 e.g., about 15 nm, i-type layer 325 e.g., about 600 nm, and an n-type region 324 e.g., about 40 nm; and the ITO layer 324, e.g., about 100 nm can form the bottom electrode. In one embodiment, dimensions of a pixel having transparent top and bottom electrodes can range between 100 μm×100 μm to 200 μm×200 μm.

Alternatively, both a p-type region 322 and an n-type region 324 of the photodiode 310 can include doped hydrogenated nanocrystalline silicon (nc-Si:H). Such doped nc-Si:H layers can have higher conductivity and/or lower optical adsorption in the visible range relative to a-Si:H or amorphous silicon carbide (a-SiC:H).

Embodiments of an imaging array, flat panel detector or x-ray imaging system and/or methods for using the same according to the application can use a photosensor structure sensitive to light impinging on a top (e.g., first) electrode and/or a bottom (e.g., second) electrode, in combination with an optically reflecting mechanism (e.g., between the glass substrate and the photo-sensor or below the glass substrate and the photosensor), can increase quantum efficiency of single side illuminated (e.g., top-illuminated) photosensors in electromagnetic imaging systems such as digital radiographic imaging systems.

Figure 4:
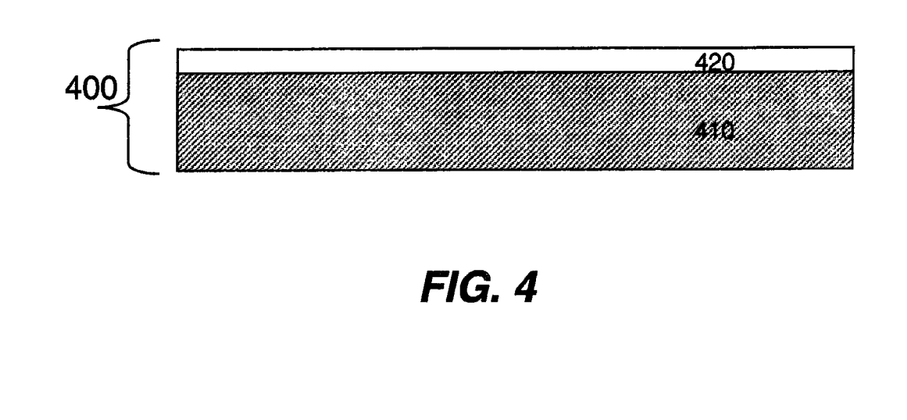
FIG. 4 is a diagram that shows a cross-section view of an exemplary embodiment of a reflector unit according to the application.

FIG. 4 is a diagram that shows an exemplary embodiment of a reflector structure according to the application. As shown in FIG. 4, a reflector structure 400 can include a reflective layer 410 and an optional insulating layer 420 provided when interactions between the reflective layer 410 and a corresponding photosensor are undesirable or to improve characteristics of the reflector structure.

The reflector layer 410 in a pixel can correspond, for example, to a first level of metallization (e.g., gate metal) of a pixel or to an additional metal level selected for overall high reflectivity or high reflectivity in a wavelength band of interest. A wavelength band can be a single wavelength. The reflector layer 410 can be a metal such as aluminum.

In one embodiment, the reflective structure 400 can be an optical dielectric stack with thickness of one or more layers chosen to increase or optimize reflection at a particular band of wavelengths to increase or optimize overall quantum efficiency of the top-side illuminated photosensor. Alternatively, the reflective structure 400 can be a dielectric film (e.g, $SiO_2$, $Si_3N_4$) with a thickness and optical property/properties to increase or optimize overall quantum efficiency. In another embodiment, the reflective structure 400 can be an organic layer or a photoacrylic selected for its reflective characteristics. In exemplary embodiments, the quantum efficiency can be based on the scintillator emission characteristics and the photosensor/photo-diode characteristics, and then the reflectivity characteristics of the reflective structure 400 can be determined to increase or optimize overall quantum efficiency. In one embodiment, an improvement in photosensor QE is larger at longer wavelengths.

Figure 5A:
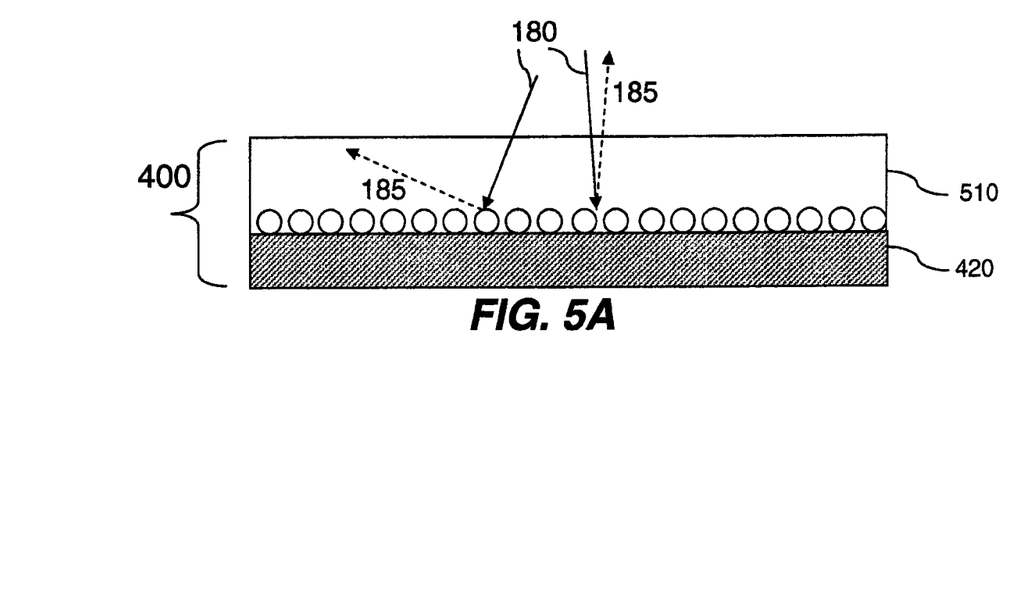
FIGS. 5A, 5B, 5C are diagrams that show a cross-section view of exemplary embodiments of reflective layers according to the application.

In one embodiment, the reflector layer 400 can be configured to improve performance, for example, by increasing a spatial resolution or decreasing cross-talk between pixels (e.g., photosensors) or increasing an angular spread of emergent light from a scintillator in a DR imaging array. As shown in FIG. 5A, a reflector layer can include a reflective control layer being a diffuse reflector 510. The diffuse reflector 510 can increase (e.g., linearly, nonlinearly) the reflective light 185 angle as the incident light 180 angle differs from perpendicular.

Figure 5B:
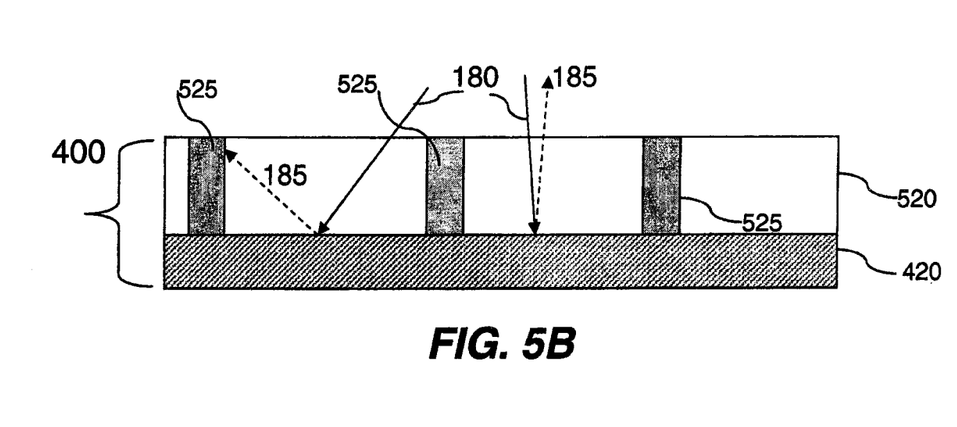
Figure 5C:
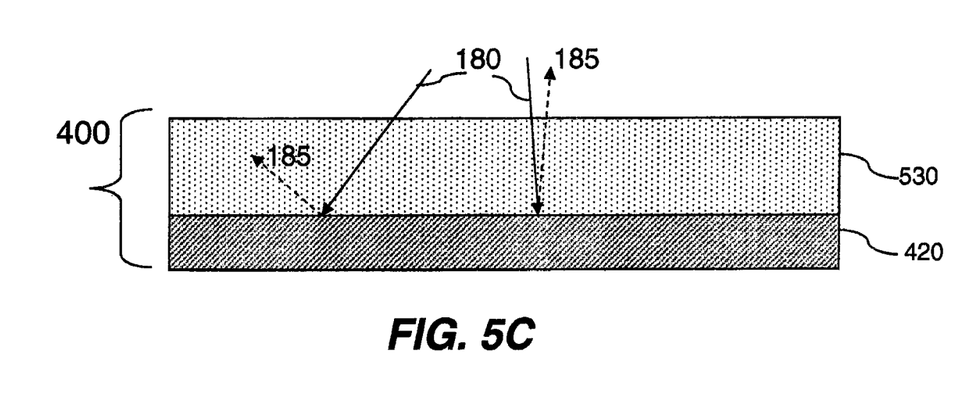

In another embodiment, the reflector layer 400 can be configured to include a reflective control layer to increase a spatial resolution or decrease cross-talk between pixels (e.g., photosensors) in a DR imaging array. As shown in FIG. 5B, the reflective control layer can be a layer 520 that can include a light absorbing pattern 525 to increasingly capture reflected light 185 as the incident light 180 angle differs from perpendicular. The light absorbing pattern 185 can be intermittent or continuous stripes aligned to rows or columns or a grid (e.g., to match a 2D layout of the pixels). Alternatively, the reflector layer 520 can include a reflecting pattern (not shown) to redirect the reflected light 185 as the incident light 180 angle differs from perpendicular. Alternatively as shown in FIG. 5C, the reflective control layer can be a reflector layer 530 that can include a diffused light absorbing material 530 to increasingly capture reflected light 185 as the reflected light 185 travels farther through the reflective layer 530. The layers 510, 520, 530 can operate to improve performance of a photosensor or imaging array. In one embodiment, the layers 510, 520, 530 can replace or supplement the optional insulating layer 420.

Digital detectors or flat panel detectors can be reset after an exposure image is captured. Related art FPDs can be reset using electrical charges (e.g., switching voltage across the diode during a reset period) or optically reset. Embodiments according to the application can provide an increase in efficiency, a decrease in a reset or bias voltage and/or an increase in consistency to reset operations (e.g., photosensor reset) because the photosensor can be reduced in thickness or contain fewer traps.

Figure 6:
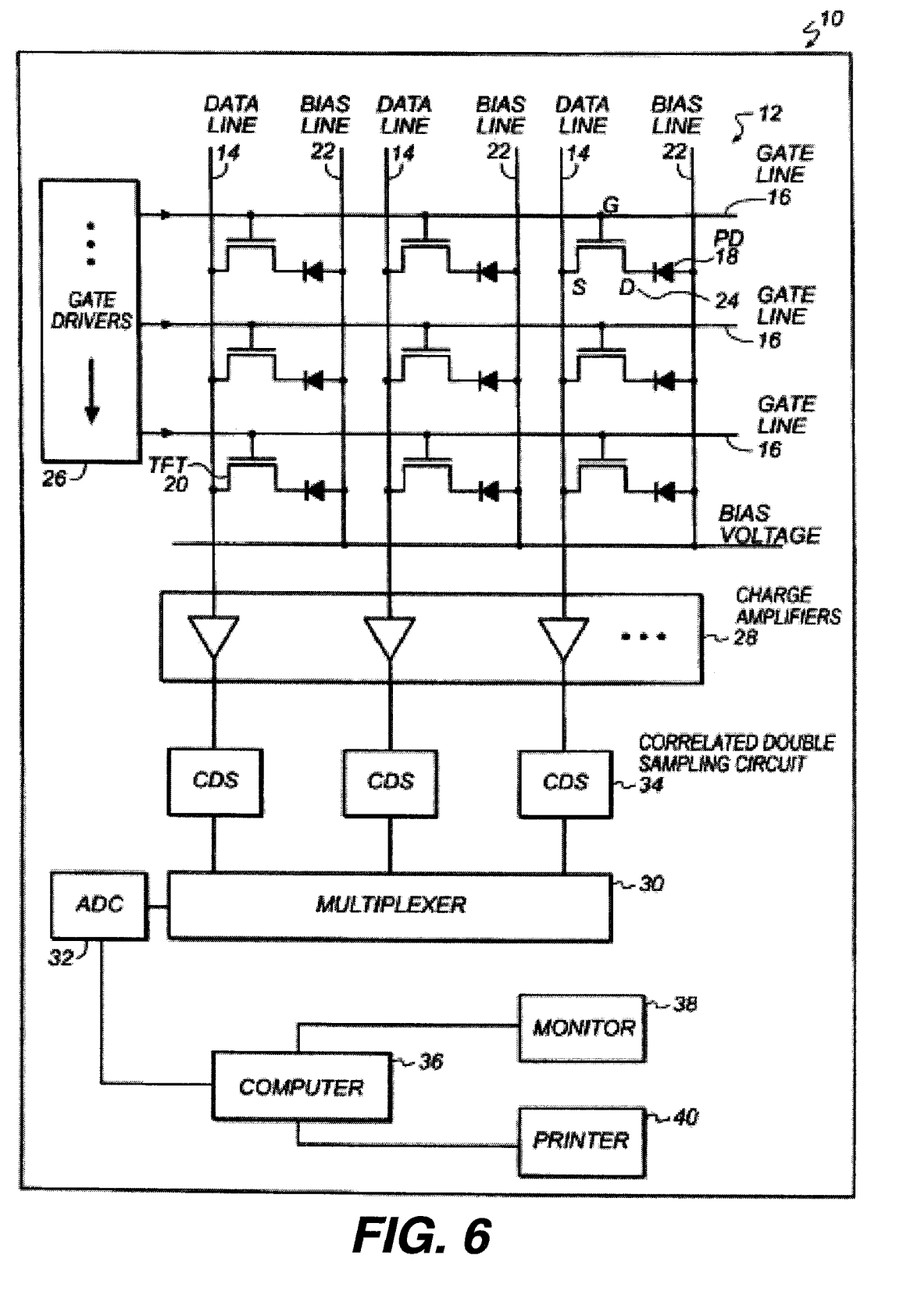
FIG. 6 is a diagram that shows an imaging panel that can be used in a flat panel radiographic imager incorporating embodiments of the application.

FIG. 6 shows a block diagram of circuitry for a flat panel imager that can incorporate embodiments of a pixel and/or imaging array according to embodiments of the application. As shown in FIG. 6. a flat panel imager 10, can include a sensor array 12. The a-Si based sensor array includes m data lines 14 and n row select or gate lines 16. Each pixel comprises an a-Si photodiode 18 connected to a TFT 20. Each photodiode 18 is connected to a common bias line 22 and a drain 24 of its associated TFT. Gate lines 16 are connected to gate drivers 26. Bias lines 22 carry bias voltages applied to photodiodes 18 and TFTs 20. TFTs 20 are controlled by their associated gate lines 26 and when addressed, transfer stored charge onto data lines 14. During readout, a gate line is turned on for a finite time (approximately 10 to 100 ms), allowing sufficient time for TFTs 20 on that row to transfer their pixel charges to all the m data lines. Data lines 14 are connected to charge amplifiers 28, which operate in parallel. In general, charge amplifiers 28 are divided into a number of groups, with each group typically having 64, 128, or 256 charge amplifiers. The associated charge amplifiers in each group detect the image signals, and clock the signals onto multiplexer 30, whence they are multiplexed and subsequently digitized by an analog to digital converter 32. The digital image data are then transferred over a coupling to memory. In some designs, a correlated double sampling (CDS) circuit 34 may be disposed between each charge amplifier 28 and multiplexer 30 to reduce electronic noise. Gate lines 16 are turned on in sequence, requiring approximately a few seconds for an entire frame to be scanned. Additional image correction and image processing are performed by a computer 36 and the resulting image is displayed on a monitor 38 or printed by a printer 40.

Figure 7:
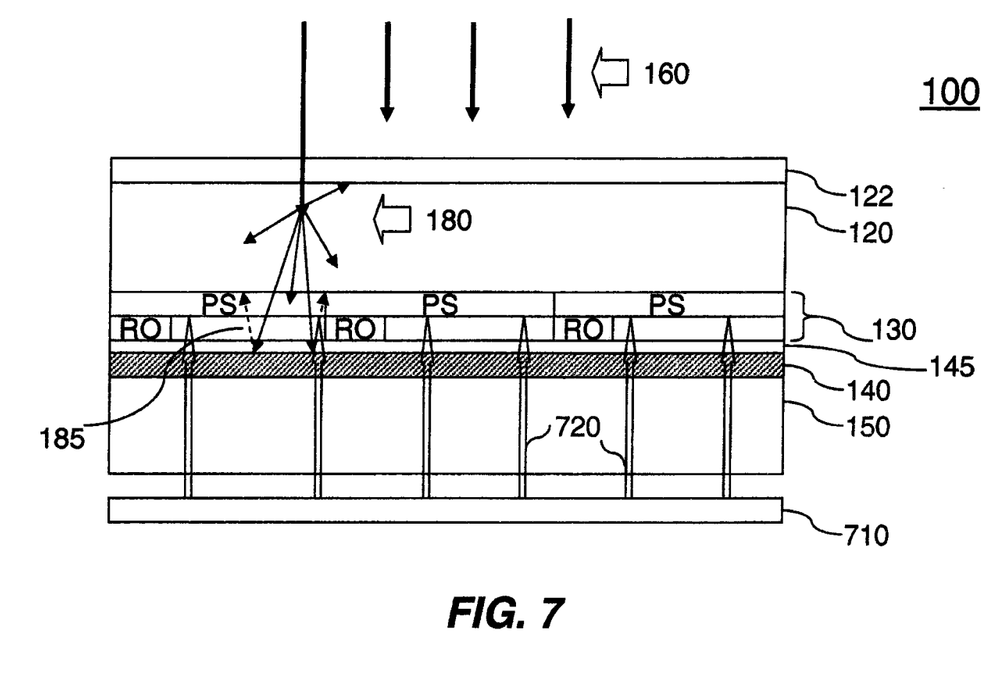
FIG. 7 is a sectional view of an exemplary embodiment of an X-ray detector with an optical reset unit beneath a reflector layer in accordance with the application.
Figure 8:
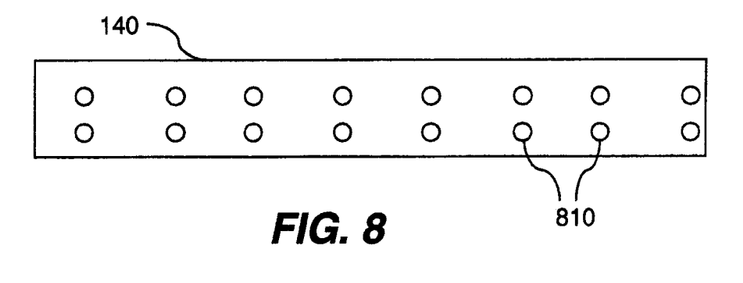
FIG. 8 is a diagram that shows a top view of an exemplary reflective layer according to the application.

FIG. 7 is a sectional view of an optically reset FPD that can incorporate embodiments of a pixel and/or imaging array according to embodiments of the application. Optical reset of photosensors can be more efficient and/or more uniform. As shown in FIG. 7, underneath the substrate 150 there is provided an optical reset unit 710. The optical reset unit 710 can includes a plurality of light sources (not shown), for example light emitting diodes that can emit light 720 in a spectral range that is suitable for resetting the photosensors PS. The photosensors PS can be reset by using of the light 720. The reflective layer 140 can be configured to pass sufficient quantities of the reset light 720 to reset the photosensors PS, PS1. In one embodiment, the reflective layer 140 can include holes sufficient to pass the reset light 720. FIG. 8 is a diagram that shows a top view of an exemplary reflective layer according to the application. As shown in FIG. 8 for example, arranged holes 810 can comprise a small amount of the surface area of the reflective layer 140 (e.g., <10%, <5%, or <2%). Alternatively, the reflective layer 140 does not have holes, but can be transparent to the reset light 720 or pass a prescribed amount (e.g., >25%, >50%, or >75%) of the incident reset light 720 impinging on a bottom surface thereof. In one embodiment, the reset light can be ultraviolet.

Figure 9:
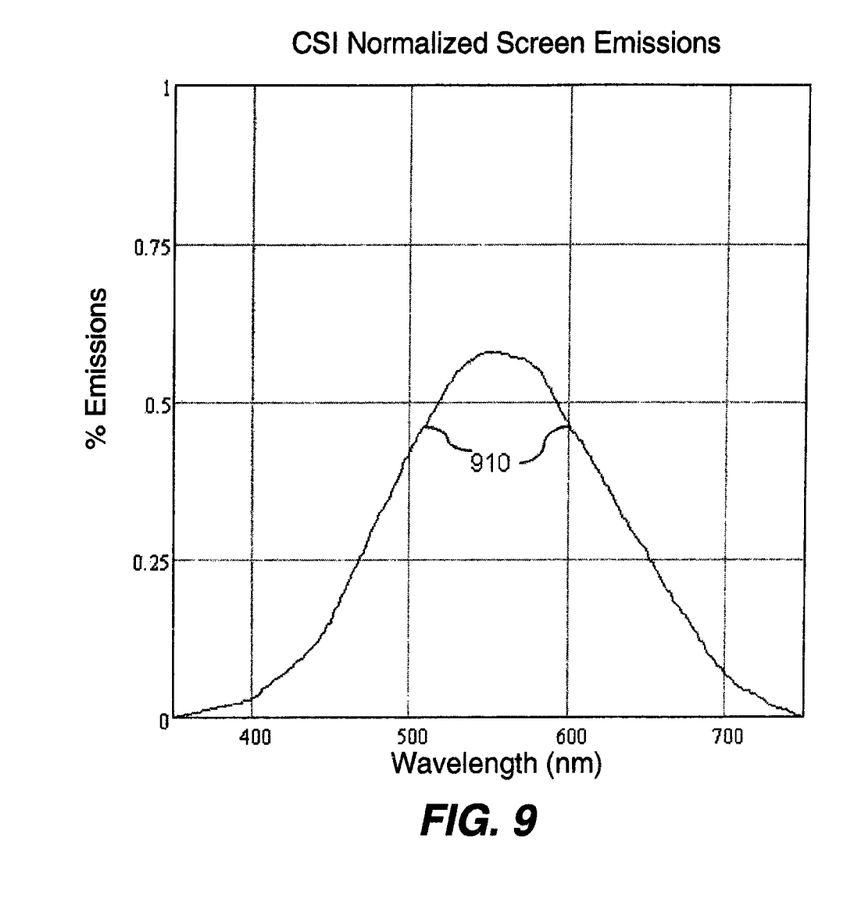
FIG. 9 is a diagram that shows a graph of normalized percent emission per nm of wavelength as a function of wavelength for an exemplary representative scintillator.

FIG. 9 is a diagram that shows a normalized percent emission per nm of wavelength as a function of wavelength for an exemplary representative scintillator. A graph 910 shows a normalized percent emission per nm of wavelength as a function of wavelength for a representative CsI scintillator (e.g., the integral of the % emission over wavelength is 100%). As shown in FIG. 9, there is significant emission at wavelengths>600 nm, where the a-Si absorption falls off.

Figure 10:
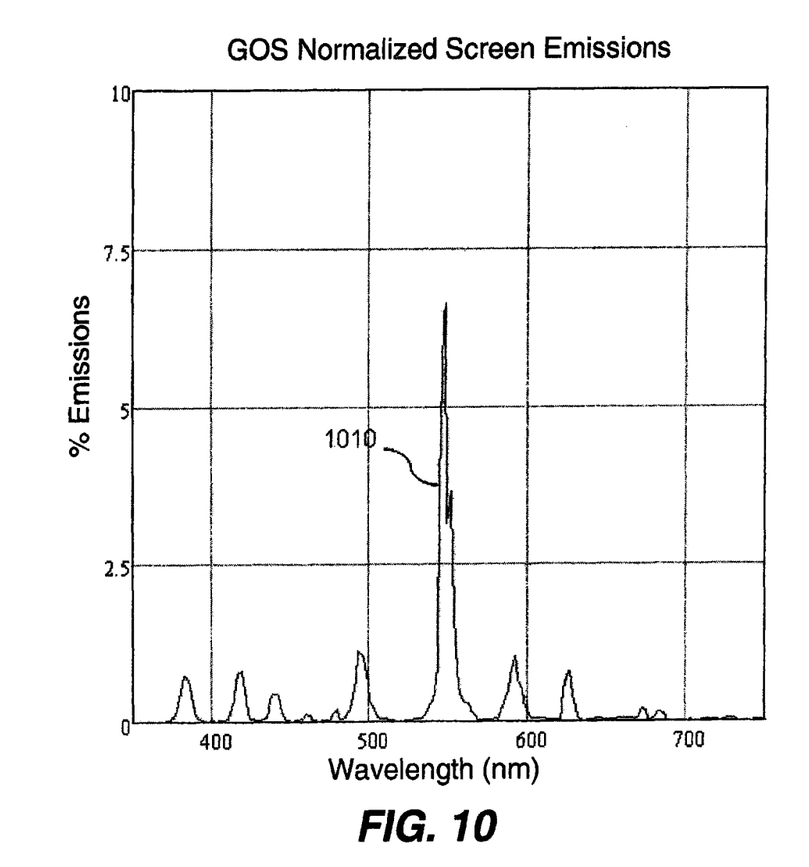
FIG. 10 is a diagram that shows a graph of normalized percent emission per nm of wavelength as a function of wavelength for another exemplary representative scintillator.

FIG. 10 is a diagram that shows a normalized percent emission per nm of wavelength as a function of wavelength for an exemplary representative scintillator. A graph 1010 shows a normalized percent emission per nm of wavelength as a function of wavelength for a representative GOS scintillator (e.g., the integral of the % emission over wavelength is 100%).

Figure 11:
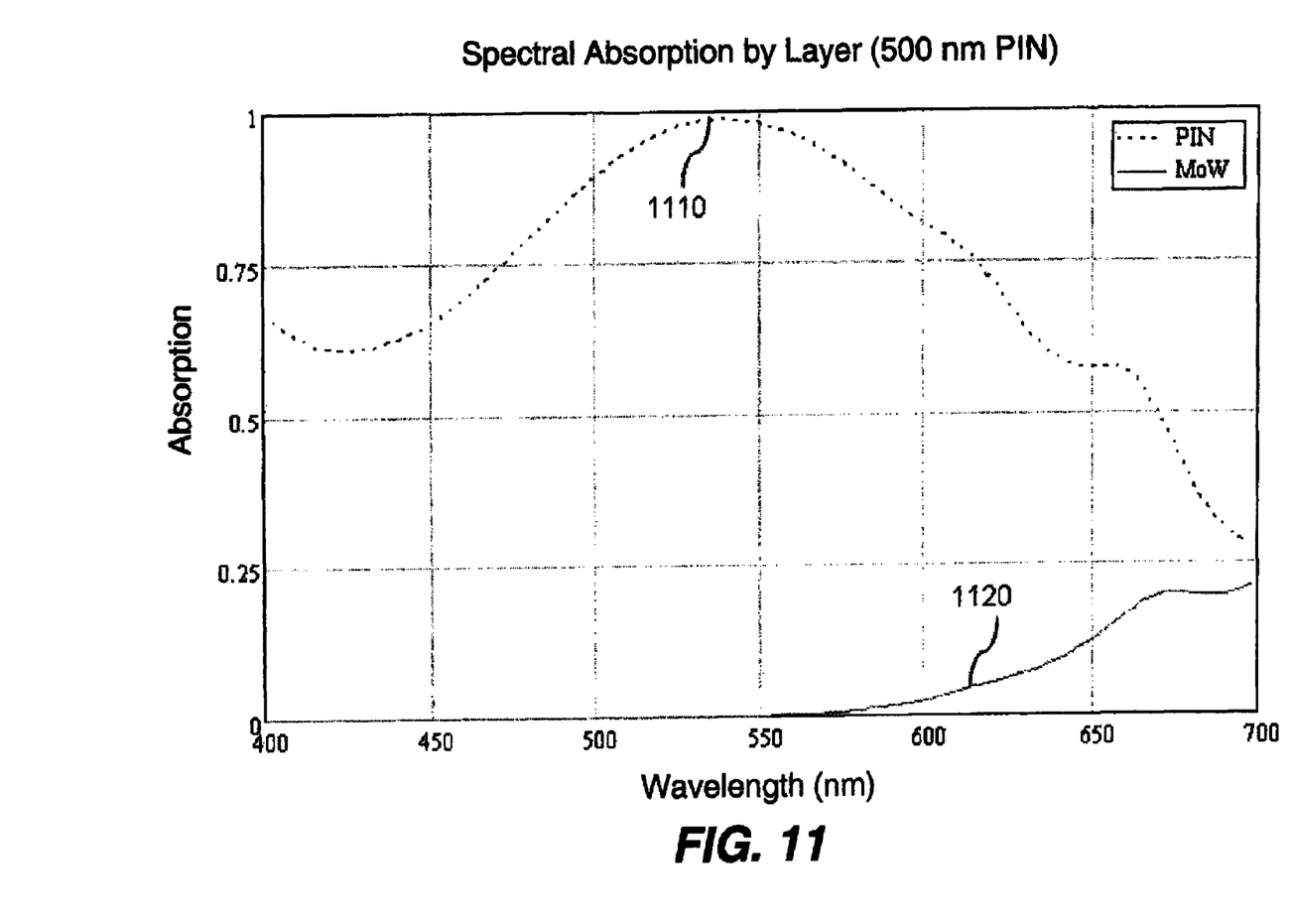
FIG. 11 is a diagram that shows a graph of light absorption in a related art amorphous silicon PIN photodiode.

FIG. 11 shows the light absorption in a representative related art PIN photodiode with 500 nm thick amorphous silicon, an ITO transparent electrode top contact and a MoW back contact. The absorption in the a-Si is shown in a first curve 1110 and the light that is transmitted through the a-Si and then absorbed in the MoW back contact is shown in a second curve 1120 in FIG. 11. There is significant energy at wavelengths>600 nm that is transmitted through the a-Si and absorbed in the MoW. In exemplary embodiments, photosensors according to the application transmit more light through the PIN photodiode.

Figure 12:
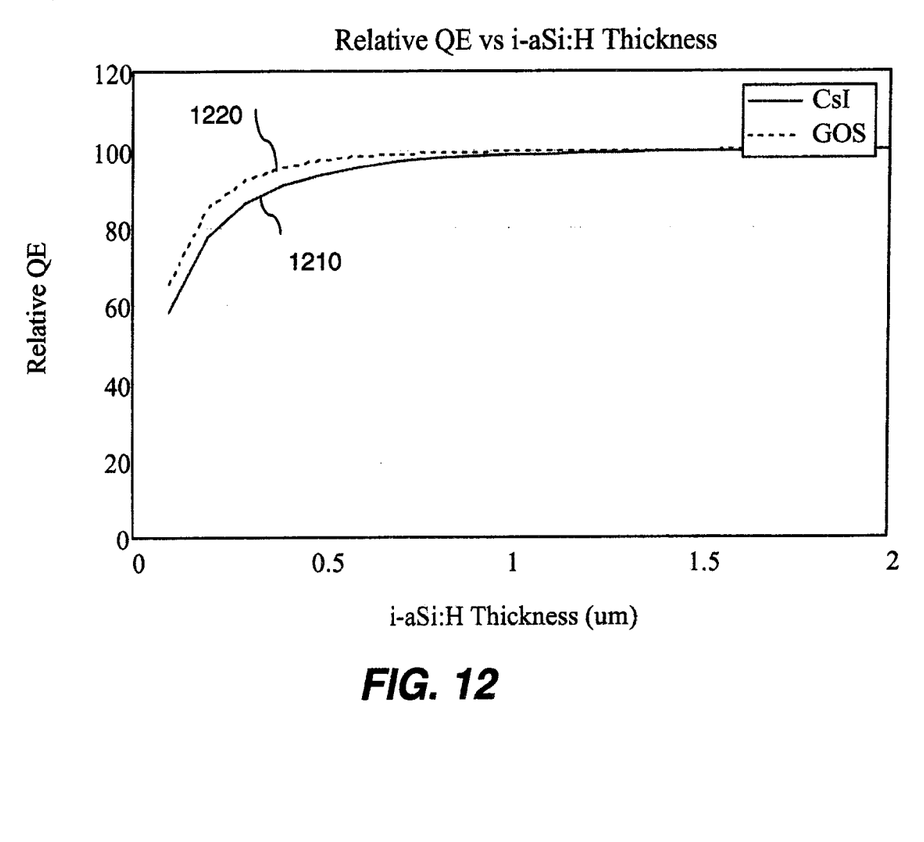
FIG. 12 is a diagram that shows a graph including relative quantum efficiency of an amorphous silicon photosensor as a function of amorphous silicon intrinsic layer thickness for exemplary scintillator screens.

FIG. 12 shows the relative quantum efficiency of an amorphous silicon PIN photodiode as a function of amorphous silicon intrinsic layer thickness calculated for emission spectra 1210 of an exemplary CsI scintillator screens and emission spectra 1220 of an exemplary GOS scintillator screens. For amorphous silicon intrinsic layer thicknesses less that 1 um, light transmission through the amorphous silicon and subsequent absorption in the MoW back contact reduces the quantum efficiency. As shown in FIG. 12, by 500 nm, the loss is ~8% for CsI emission spectra and by 250 nm the loss is 25%. Thin a-Si thicknesses are desirable for reducing the dark current, reducing the image lag caused by trapping, and/or increasing the charge capacity. For related art PIN photodiodes with a metal (e.g., MoW, Mo) or light absorbing backside contact, the signal-to-noise is selected with or optimized with a 500 nm intrinsic layer thickness. For exemplary PIN photodiodes including light transmissive electrodes and including an embodiment of a reflective layer, a reduced thickness such as 250 nm thickness would result in about the same quantum efficiency as the 500 nm related art photodiode, but could include reduced noise, reduced image lag and/or higher charge capacity. Alternatively, according to embodiments, a thickness of the intrinsic layer or semiconductor layers of the photosensor can be less than 200 nm, 300 nm, 350 nm or 400 nm.

Embodiments of reflector layers and methods for using the same are based on characteristics of scintillator materials and photosensor materials. Embodiments of reflective layers can be selected, for example, to increase quantum efficiency based on emission characteristics of the scintillator and absorption characteristics of photodiodes in the FPR. In one embodiment, scintillator properties can include at least one of scintillator thickness, scintillator composition, scintillator x-ray absorption coefficient, and scintillator light emission spectra. In one embodiment, photosensor characteristics can include at least one of photosensitive element area, photosensitive element pitch, photosensitive element sensitivity, or characteristics for each of photosensor layers therein can include absorption coefficient as a function of wavelength, index of refraction as a function of wavelength, or thickness. In one embodiment, characteristics of reflector layers can include at least one of spectral reflectance or angular distribution of reflected light. An optional an optically transparent dielectric formed between a reflective layer and the photosensors can be a dielectric with characteristics of absorption coefficient as a function of wavelength or index of refraction as a function of wavelength.

In one embodiment, absorption of reflected light can be at least 15%, at least 25%, or at least 35% of total absorption of photosensors in the DR detector for light between 550 nm to 700 nm or absorption of reflected light increases an absorption of the photosensors for at least one wavelength of the light between 550 nm to 700 nm by more than a prescribed amount such as 10% or 20%. A thickness of photosensors can be configured to pass at least 50% of at least one wavelength of the impinging light from the scintillator, which can be between 400-700 nm. Embodiments of reflective layer can be selected to preferentially reflect a prescribed band of wavelengths or include a reflection coefficient is highest for wavelength selected between 550-650 nm or 500-700 nm.

It is gradually commonly recognized that the screening, image-guided interventional whether in regular x-ray radiographic or CT imaging should reduce or minimize the associated X-ray exposure risk to the subjects and operators. As photosensor thickness decreases, an x-ray dose can be reduced. X-ray low dose medical imaging will be very attractive if the same or better image quality can be achieved compared to what current medical X-ray technology can do but with less X-ray dose.

It should be noted that the present teachings are not intended to be limited in scope to the embodiments illustrated in the figures.

While the invention has been illustrated with respect to one or more implementations, alterations and/or modifications can be made to the illustrated examples without departing from the spirit and scope of the appended claims. For example, the various pixel embodiments can be used in radiation imaging systems. An example radiation imaging system can include a plurality of the various pixel embodiments in an array, driving circuits, readout circuits, and a phosphor screen. A radiation source can also be included. Further, DR image sensors/methods embodiments can be used for radiographic applications, fluoroscopic applications, mobile imaging system applications and/or volume image reconstruction applications.

In addition, while a particular feature of an embodiment has been disclosed with respect to only one of several implementations, such feature can be combined with one or more other features of the other implementations and/or other exemplary embodiments as can be desired and advantageous for any given or particular function. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of −2 and the maximum value of 10, that is, any and all sub-ranges having a minimum value equal to or greater than −2 and a maximum value equal to or less than 10, e.g., 1 to 5. Furthermore, to the extent that the terms "including", "includes", "having", "has", "with", or variants thereof are used in either the detailed description and the claims, such terms are intended to be inclusive in a manner similar to the term "comprising." As used herein, the term "connected" means electrically connected either directly or indirectly with additional elements in between. As used herein, the term "one or more of" or "and/or" with respect to a listing of items such as, for example, "A and B" or "A and/or B", means A alone, B alone, or A and B. The term "at least one of" is used to mean one or more of the listed items can be selected.

Further, in the discussion and claims herein, the term "on" used with respect to two materials, one "on" the other, means at least some contact between the materials, while "over" means the materials are in proximity or near each other, but possibly with one or more additional intervening materials such that contact is possible but not required. Neither "on", "above", below", "over" nor "under" implies any directionality as used herein. The term between as used herein with respect to two elements means that an element C that is "between" elements A and B is spatially located in at least one direction such that A is proximate to C and C is proximate to B or vice versa. The term "conformal" describes a coating material in which angles of the underlying material are preserved by the conformal material. Further, in the discussion and claims herein, the term "exemplary" indicates the description is used as an example, rather than implying that it is an ideal.

The invention has been described in detail with particular reference to exemplary embodiments, but it will be understood that variations and modifications can be effected within the spirit and scope of the invention. The presently disclosed embodiments are therefore considered in all respects to be illustrative and not restrictive. Other embodiments of the invention will be apparent to those skilled in the art from consideration of the specification and practice of the invention disclosed herein. The scope of the invention is indicated by the appended claims, and all changes that come within the meaning and range of equivalents thereof are intended to be embraced therein. While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects and/or features of embodiments variously described herein can be specifically interchanged or combined.

I claim:

1. A radiographic imaging device comprising:
   a scintillator;
   a plurality of photosensitive elements, each photosensitive element extending between a first side to receive first light from the scintillator and a second opposite side to pass second light responsive to impingement of the first light;
   a reflective layer spaced from the plurality of photosensitive elements and configured to receive the second light from the plurality of photosensitive elements and configured to reflect third light responsive to impingement of the second light; and
   a substrate on the second side of the plurality of photosensitive elements, wherein photosensitive element characteristics of the plurality of photosensitive elements are selected to absorb a prescribed amount of the first light received through the first side and the third light received through the second side, wherein the reflectivity of the reflective layer is greater than 50%, wherein a thickness of said each photosensitive element of the plurality of photosensitive elements is configured to pass at least 50% of at least one wavelength of the first light, wherein the first light is between 400-700 nm.

2. The device according to claim 1, wherein the photosensitive element characteristics are based on an emission characteristic of a material comprising the scintillator.

3. The device according to claim 1, wherein the absorption of the third light comprises at least 35% of total absorption of the plurality of photosensitive elements for light between 550 nm to 700 nm or the absorption of the third light increases an absorption of the plurality of photosensitive elements for at least one wavelength of the light between 550 nm to 700 nm by more than 20%.

4. The device according to claims 1, wherein a-Si semiconductor portions of photosensors forming the plurality of photosensitive elements includes a thickness of less than 400 nm, or wherein semiconductor portions of the photosensors include a thickness of less than 400 nm.

5. The device according to claim 1, wherein the reflective layer is selected to preferentially reflect a prescribed band of wavelengths or a reflection coefficient of the reflective layer is highest for wavelength selected between 540 and 650 nm.

6. The device according to claim 1, wherein the reflective layer is selected to increase quantum efficiency based on emission characteristics of the scintillator and absorption characteristics of photodiodes forming the plurality of photosensitive elements.

7. The device according to claim 1, further comprising an optically transparent dielectric formed between the reflective layer and the plurality of photosensitive elements, wherein the dielectric characteristics comprise at least one of absorption coefficient as a function of wavelength or index of refraction as a function of wavelength or the index of refraction is a complex variable.

8. The device according to claim 1, wherein the reflective layer comprises a plurality of deposited dielectrics forming a dielectric stack, a metal, an organic layer, or a dielectric film, where the reflective layer is universally deposited over a glass substrate corresponding to an imaging array or under the glass substrate corresponding to the imaging array.

9. The device according to claim 1, wherein the at least one readout element comprises at least one transistor formed vertically under a photosensor being a photosensitive element or at least one transistor formed co-planar with the photosensor, and wherein the photosensor comprises PIN photodiodes, MIS photo-sensors, photo-transistors and photo-conductors.

10. The device according to claim 1, wherein the reflective layer comprises light-scattering particles diffused throughout a reflection control layer to reduce light scattering between pixels or a light-absorbing colorant grid applied to the reflection control layer to reduce light scattering between the pixels.

11. The device according to claim 1, where the reflective layer comprises a reflective control layer including a diffuse reflector to increase the angular distribution of the reflective light as compared to the incident light.

12. The device according to claim 1, further comprising an optical reset arrangement arranged below the reflector layer for resetting the plurality of photosensitive elements using the second side, the reflector layer to enable reset light from the optical reset arrangement to pass therethrough to reset the plurality of photosensitive elements.

13. The device according to claim 1, wherein the photosensitive element characteristics comprise at least one of photosensitive element area, photosensitive element pitch, photosensitive element sensitivity, wherein the photosensitive element characteristics for each of photosensor layers therein comprise absorption coefficient as a function of wavelength, index of refraction as a function of wavelength, or thickness, and wherein scintillator properties comprise at least one of scintillator thickness, scintillator composition, scintillator x-ray absorption coefficient, and scintillator light emission spectra.

14. The device according to claim 1, wherein characteristics of the reflector layer comprises at least one of spectral reflectance or angular distribution of reflected light.

15. The device according to claim 1, wherein the absorption of the third light increases an absorption of the plurality of photosensitive elements for at least one wavelength of the light between 550 nm to 700 nm by more than 10%.

16. A method for operating a radiographic imaging apparatus for capturing a plurality of x-ray images of an object comprising:
providing a scintillation screen for receiving incident radiation and responding by emitting excited radiation at a first band of wavelengths;
providing an array of photosensors, each photosensor extending between a first side and a second side, the first side for receiving first light at the first band of wavelengths from the scintillator, the second side for passing a portion of the first light that was not absorbed as second light responsive to impingement of the first light;
providing a reflective layer for receiving the second light and for reflecting a portion of the second light as third light responsive to impingement of the second light; and
providing a substrate over the second side for supporting the array of photosensitive elements, said each photosensor of the array of photosensors absorbing a prescribed amount of the first light and absorbing a prescribed amount of the third light received through the second side, wherein the reflectivity of the reflective layer is greater than 50%, wherein the absorption of the third light comprises at least 15% of total absorption of the plurality of photosensitive elements for light between 550 nm to 700 nm.

17. The method of claim 16, wherein at least one layer of the photosensors has a reduced thickness to pass a prescribed amount of a selected wavelength band through the second sides, wherein the reduced thickness of the at least one layer of the photosensors is configured to reduce dark current generated by each photosensor or to reduce image lag generated by said each photosensor, which are dependent on a number of total electrical traps in said each photosensor.

18. The method of claim 16, comprising providing an optical reset arrangement arranged below the substrate for resetting the photosensors using the second side, the reflector arrangement to enable reset light from the reset arrangement to pass therethrough to reset the photosensors.

19. The method of claim 16, wherein the reflective layer comprises light-scattering particles diffused through a reflection control layer to reduce light scattering between pixels or a light-absorbing colorant grid applied to the reflection control layer to reduce light scattering between the pixels.

20. A method for operating a radiographic imaging apparatus for capturing a plurality of x-ray images of an object comprising:
providing a scintillation screen for receiving incident radiation and responding by emitting excited radiation at a first band of wavelengths;
providing an array of photosensors, each photosensor extending between a first side and a second side, the first side for receiving first light at the first band of wavelengths from the scintillator, the second side for passing a portion of the first light that was not absorbed as second light responsive to impingement of the first light;
providing a reflective layer for receiving the second light and for reflecting a portion of the second light as third light responsive to impingement of the second light; and
providing a substrate over the second side for supporting the array of photosensitive elements,
said each photosensor of the array of photosensors absorbing a prescribed amount of the first light and absorbing a prescribed amount of the third light received through the second side, wherein the reflectivity of the reflective layer is greater than 50%, wherein a thickness of said each photosensitive element of the plurality of photosensitive elements is configured to pass at least 50% of at least one wavelength of the first light, wherein the first light is between 400-700 nm.

* * * * *